Patented Nov. 29, 1938

2,138,177

UNITED STATES PATENT OFFICE 2,138,177

ANIMAL FOOD

Earl Kruger and Walter M. Kendall, Portland, Oreg., assignors to Kendall Dog Food Company, Portland, Oreg.

No Drawing. Application May 31, 1935, Serial No. 24,400

1 Claim. (Cl. 99—7)

The object of our invention is to provide a balanced foodstuff having a preponderant meat content, which food stuff is dry, comminuted and concentrated. The meat therein, although reduced for the purpose of dehydration, concentration and to give it keeping properties, retains its nutritive values and the remainder of such foodstuff provides the necessary protein content to produce a balanced diet.

It is generally accepted to be a fact that uncooked meat provides a dog, or other carnivorous animal, with vital energy which is not provided by boiled or otherwise cooked meats. A dog fed upon a diet lacking in said vital nutritive values evidences a nervous disposition and generally lacks that keen look of perfect health which is apparent in a dog that feeds upon some fresh meat. We have discovered that if meat is baked in a closed container at a temperature not exceeding substantially the point of vaporization of water that said cooking gives the meat valuable keeping properties without destroying said nutritive values. It is necessary, of course, if said food stuff is to be kept, that the meat be cooked because it is impossible to hold fresh meat in any large quantities for any substantial time.

We have further determined that a baked cereal product is not easily digested by a carnivorous animal. Cereal seemingly is a wholly foreign foodstuff which is digested, if at all, only with difficulty and in small quantities. We have discovered that biscuits which provide the necessary protein content and bulk in foods of this character can be rendered more easily digestible without being rendered flinty by incorporating either a very small amount of meat or a very large amount of meat and then by proportioning the two meat biscuits, a proper balance of biscuit material and meat can be attained.

A further factor entering into the production of a foodstuff of this character is that the most of the ingredients must be ground into small bits so as to be absorbtive of moisture quickly and easily. It is desirable, however, that some portions of the food remain in large pieces, not relatively absorbtive of moisture, so that the animal may have something to chew upon to keep its gums and teeth in perfect condition. We have accomplished this result by proportioning the parts of the biscuit material so that some portions are from a quarter inch to a half inch in size and of a consistency that they will not readily become soggy by moisture; they contain meat, however, and thus are more easily digested by the animal.

Another factor involving some difficulty in foodstuff of this character is to prevent separation of the various particles of foodstuff, some necessarily being larger than others. The particles, differing in size, separate out and thus a unit quantity being removed from a larger quantity would not contain in proper proportion the various percentages desirable to produce a balanced ration. We have been able to counteract this tendency and to add nutritive value to the food by intermixing, and taking up a small quantity of cod liver oil. Said cod liver oil is thoroughly intermixed with all said materials.

Further features of our improved animal food and novel features of its manufacture and compounding are hereinafter described in greater detail.

As has been pointed out, a foodstuff for a carnivorous animal necessarily must contain a predominance of meat and it is essential that the meat retain its nutritive values so that the animal eating said food will have the benefits thereof. Meat cooked in a closed vessel at a temperature under 250 degrees Fahrenheit, as in a steam jacketed cylinder, is not deficient in these valuable properties. The moisture is then expressed therefrom in a press until it is compressed to 20% to 25% of its original volume. The moisture content after said pressing has been complete is approximately 8% of the pressed product, and 8 to 10% of said product is fat. The remainder is meat tissue and bone. Thus around 400 pounds of said compressed meat is the equivalent of one ton of raw meat baked and with the moisture removed.

If 400 pounds of said compressed meat would be mixed with a ton of other foodstuffs, to produce a foodstuff having half meat content, a dog, for example, would not stay upon a continued diet of this foodstuff because the meat flavor would be too evident. If a smaller amount of meat is used, the diet will not be predominantly meat, which is unsatisfactory.

Experience has determined that the best material to mix with meat is baked biscuits. A biscuit mix of one part meat and five parts flour approaches an ideal mix to promote digestion, but such a mixture is unsatisfactory because the resultant biscuit is hard and flinty in character. A biscuit containing about seven pounds of said dehydrated meat and fifty-four pounds of flour in the biscuit mix produces a fluffy biscuit. Also a biscuit mix containing approximately twenty pounds of dehydrated meat to thirty pounds of flour also produces a fluffy, easily digestible biscuit. A biscuit containing no meat, although it has proper consistency, is digestible, if at all, only with great difficulty. We have discovered that if we proportion the biscuits so that the one with a very small meat content is mixed with one having a large meat content that a proper balanced quantity of biscuit can be provided for supplementing the dehydrated meat in the foodstuff. Said predetermined mixture of biscuit also decreases the amount of dehydrated meat that must be contained in said food stuff and increases the palatability of the latter to permit a dog, for example, to stay on a continued diet of the mixture.

It is desirable, also to add milk and some form of wheat cereal to the mixture to produce a proper scientific balance and increase palatability of said mixture. The wheat cereal preferably is in the form of baked shreds so that the starch content of the cereal is changed to dextrin, in as large a degree as is possible. The milk preferably is added into the mixture in powdered and dehydrated form.

One specific example of our invention of a dog food prepared by the method described and incorporating our invention is as follows:

One of the biscuits containing a small amount of dehydrated beef is prepared from fifty-four pounds of flour and seven pounds of dehydrated beef. One pound of salt and twenty-five pounds of water are added. The dough is mixed, kneaded and rolled to sections ⅜ of an inch thick and are then cut into conveniently sized sections, are perforated and are baked one hour at a temperature of approximately 350 degrees.

A biscuit containing a large amount of meat is prepared from 30 pounds of flour, 20 pounds of dehydrated beef, one pound of salt and 23 pounds of water. This biscuit mix is prepared in the same manner as the first mentioned biscuit.

The wheat cereal is preferably in the form of shredded cereal and is similar to the well-known breakfast food known as Shredded Wheat.

A dog food containing said ingredients is composed of approximately 45% of the first described biscuit and 13 to 14% of the second described biscuit. Said biscuits are cracked or broken so that 60% of them are between one fourth of an inch and one half an inch in thickness and will pass through a ⅝ inch screen and the remainder is of a size that will pass through a ⅝ inch screen but be retained by a ⅛ inch screen thus eliminating biscuit dust and small particles.

The wheat cereal which constitutes approximately 20% of the mixture is broken so that the shreds are separated from the remainder.

Approximately 15% of said mixture is dehydrated beef which, being approximately ⅕ or ¼ of its original bulk, is thus equivalent to four or five times its concentrated form.

To said mixture is added five percent dry flaked skimmed milk, one per cent dry yeast and approximately ½ of 1% cod liver oil or sardine oil. An oil is preferably selected which has a high vitamin content for the usual purpose and is quite viscous so that it will serve as a binder for the materials that have been set out previously. Approximately 5% or 10% of the wheat cereal is separated from the remainder and the cod liver oil is thoroughly intermixed therewith by being poured thereover and is smeared thereon until all of said oil is carried by or absorbed by said cereal. Said oily cereal is then returned to the remainder and the whole mixture is thoroughly agitated for approximately ten minutes. The intermixture causes the oil-carrying cereal to be thoroughly dispersed throughout the whole and causes the oil smeared upon the said cereal to be wiped off on the other particles so that said oil efficiently serves its purpose as a binder for said material.

The dry food stuff can be prepared for an animal by mixing one half of a cup of warm water with a cup of said material. Said foodstuff absorbs said water and a gruel is produced, but one in which the large lumps of biscuit are still in solid form which require the animal to chew them with the advantages heretofore set out.

It is to be noted that all of the foodstuffs which require cooking or heating have been so treated without affecting any of the other products such as the milk, yeast, and cod liver oil in which heat would destroy their valuable properties.

We claim:

A foodstuff of the character described comprising approximately fifteen per cent comminuted dry-rendered baked meat reduced approximately to one-fourth of its original bulk, baked biscuit material approximately sixty per cent and the remainder including a dry cereal, the whole intermixed with a small quantity of viscous edible oil having anti-rachitic properties, said oil being intimately interspersed throughout said foodstuff, said baked biscuit material including a plurality of forms, each form having a meat content, each of said forms being fluffy and easily digestible, said forms being proportioned relatively to each other in said foodstuff to produce a predetermined meat ratio therein, one form containing a very small amount of meat and another a very large amount of meat.

EARL KRUGER.
WALTER M. KENDALL.